US009440540B2

(12) United States Patent
Yamamoto et al.

(10) Patent No.: US 9,440,540 B2
(45) Date of Patent: Sep. 13, 2016

(54) ELECTRIC VEHICLE AND CONTROL METHOD

(71) Applicants: Masaya Yamamoto, Kasugai (JP); Itaru Seta, Tokyo (JP)

(72) Inventors: Masaya Yamamoto, Kasugai (JP); Itaru Seta, Tokyo (JP)

(73) Assignees: Toyota Jidosha Kabushiki Kaisha, Toyota-shi, Aichi-ken (JP); Fuji Jukogyo Kabushiki Kaisha, Tokyo (JP)

( * ) Notice: Subject to any disclaimer, the term of this patent is extended or adjusted under 35 U.S.C. 154(b) by 98 days.

(21) Appl. No.: 14/410,745

(22) PCT Filed: Aug. 28, 2013

(86) PCT No.: PCT/IB2013/001853
§ 371 (c)(1),
(2) Date: Dec. 23, 2014

(87) PCT Pub. No.: WO2014/033529
PCT Pub. Date: Mar. 6, 2014

(65) Prior Publication Data
US 2015/0191089 A1 Jul. 9, 2015

(30) Foreign Application Priority Data

Aug. 29, 2012 (JP) ................................. 2012-188684

(51) Int. Cl.
| B60W 30/20 | (2006.01) |
| B60L 7/18 | (2006.01) |
| B60L 7/26 | (2006.01) |
| B60L 11/12 | (2006.01) |
| B60L 11/14 | (2006.01) |
| B60W 30/18 | (2012.01) |
| B60W 10/08 | (2006.01) |
| B60W 10/184 | (2012.01) |
| B60W 10/188 | (2012.01) |
| B60K 6/445 | (2007.10) |

(52) U.S. Cl.
CPC .. *B60L 7/18* (2013.01); *B60L 7/26* (2013.01); *B60L 11/123* (2013.01); *B60L 11/126* (2013.01); *B60L 11/14* (2013.01); *B60W 10/08* (2013.01); *B60W 10/184* (2013.01); *B60W 10/188* (2013.01); *B60W 20/14* (2016.01); *B60W 30/18127* (2013.01); *B60W 30/20* (2013.01); *B60K 6/445* (2013.01); *B60L 2240/12* (2013.01); *B60L 2240/421* (2013.01); *B60L 2240/423* (2013.01); *B60L 2240/642* (2013.01); *B60L 2270/145* (2013.01); *B60W 2710/083* (2013.01); *B60W 2710/182* (2013.01); *B60Y 2300/89* (2013.01); *Y02T 10/6217* (2013.01); *Y02T 10/6239* (2013.01); *Y02T 10/642* (2013.01); *Y02T 10/7077* (2013.01); *Y02T 10/7258* (2013.01); *Y02T 10/7291* (2013.01); *Y02T 90/16* (2013.01)

(58) Field of Classification Search
CPC ............................. B60W 30/20; B60W 20/14
See application file for complete search history.

(56) References Cited

U.S. PATENT DOCUMENTS 8,040,084 B2 * 10/2011 Muta ...................... B60K 6/445
318/375
8,267,220 B2 * 9/2012 Sugiyama ............ B62D 5/0463
180/443

(Continued)

FOREIGN PATENT DOCUMENTS

| JP | 9-215106 | 8/1997 |
| JP | 2004-328884 | 11/2004 |
| JP | 2006-136184 | 5/2006 |

*Primary Examiner* — Thomas Tarcza
*Assistant Examiner* — Alex C Dunn
(74) *Attorney, Agent, or Firm* — Finnegan, Henderson, Farabow, Garrett & Dunner, LLP

(57) ABSTRACT

An electric vehicle includes an electric motor outputting regenerative torque to a drive shaft connected to an axle shaft, a hydraulic brake providing braking force for the vehicle, and an electronic control unit. The electronic control unit is configured to execute a regeneration coordination switch in which at least part of the regenerative torque from the electric motor is gradually switched to the braking force from the hydraulic brake. The electronic control unit is configured to execute a vibration suppression control that restrains vibration of the vehicle. The electronic control unit is configured to increase frequency of execution of the vibration suppression control when the regeneration coordination switch is performed, as compared to frequency of execution of the vibration suppression control when the regeneration coordination switch is not being performed.

5 Claims, 4 Drawing Sheets

(56) References Cited

U.S. PATENT DOCUMENTS

| | | | | |
|---|---|---|---|---|
| 8,365,860 B2* | 2/2013 | Mukai | .................... | B62D 5/008 180/444 |
| 8,626,394 B2* | 1/2014 | Kezobo | ................ | B62D 5/0472 180/443 |
| 8,682,546 B2* | 3/2014 | Otsuka | ................. | F02D 11/105 123/192.1 |
| 8,924,080 B2* | 12/2014 | Oniwa | ................... | G05D 17/02 701/41 |
| 9,075,400 B2* | 7/2015 | Igarashi | .............. | H02P 29/0038 318/623 |
| 9,186,989 B2* | 11/2015 | Hashimoto | ............ | B60K 6/445 |
| 2006/0076914 A1 | 4/2006 | Yaguchi | | |
| 2010/0113214 A1* | 5/2010 | Krueger | ................ | B60K 6/365 477/28 |

* cited by examiner

ELECTRIC VEHICLE AND CONTROL METHOD

CROSS-REFERENCE TO RELATED APPLICATIONS

This application is a national phase application of International Application No. PCT/IB2013/001853, filed Aug. 28, 2013, and claims the priority of Japanese Application No. 2012-188684, filed Aug. 29, 2012, the content of both of which is incorporated herein by reference.

BACKGROUND OF THE INVENTION

1. Field of the Invention

The invention relates to an electric vehicle and, more particularly, to an electric vehicle equipped with an electric motor outputting regenerative torque to a drive shaft connected to an axle shaft and a hydraulic brake providing braking force for a vehicle, and to a control method for the electric vehicle.

2. Description of Related Art

An electric vehicle in which a vibration suppression control is executed if a sharp change in regenerative torque is detected while a vehicle-driving electric motor is outputting regenerative torque has been proposed (see, e.g., Japanese Patent Application Publication No. 09-215106 (JP 09-215106 A)). In this vehicle, if a sharp change in regenerative torque is detected, a vibration suppression correction torque is calculated. The vibration suppression correction torque is the torque that will cancel out the fluctuation of the electric motor rotation speed caused by the sharp change in regenerative torque. Then, the vibration suppression control is performed by setting a torque command obtained by adding the vibration suppression correction torque to a regenerative torque that is demanded of the electric motor. By performing the vibration suppression control as described above, vibration at the time of a sharp change in regenerative torque is restrained.

However, in the foregoing electric vehicle, since the vibration suppression control is performed at the time of occurrence of a sharp change in the regenerative torque, vibration of the vehicle is restrained after the vibration has occurred. That is, vibration of the vehicle may not be able to be quickly restrained or may become large. On the other hand, it is also conceivable to always perform the vibration suppression control regardless of the presence or absence of a sharp change in regenerative torque. However, this may increase energy consumption and leads to deterioration in energy efficiency.

Some electric vehicles perform a regeneration coordination switching control in which the regenerative torque from the electric motor is switched to the braking force from the hydraulic brake. The regeneration coordination switching control is executed by gradually decreasing the regenerative torque while gradually increasing the braking force provided by the hydraulic brake. The regenerative torque is regenerated by the electric motor, which normally is high in response and therefore can be controlled relatively accurately. On the other hand, the braking force provided by the hydraulic brake, which normally is low in response and may not be accurately controlled in comparison with the electric motor. Therefore, because of the difference in response speed, communication lag and the like, the switching control may not be carried out a switch between equal amounts and may be cause of vibration to occur on the vehicle.

SUMMARY OF THE INVENTION

The invention provides an electric vehicle that restrains vibration of the vehicle and restrains deterioration in energy efficiency, and a control method for the electric vehicle.

A first aspect of the invention is an electric vehicle that includes: an electric motor outputting regenerative torque to a drive shaft connected to an axle shaft; a hydraulic brake providing braking force for the electric vehicle; and an electronic control unit. The electronic control unit is configured to execute a regeneration coordination switch in which at least part of the regenerative torque from the electric motor is gradually switched to the braking force from the hydraulic brake. The electronic control unit is configured to execute a vibration suppression control that restrains vibration of the vehicle. The electronic control unit is configured to increase frequency of execution of the vibration suppression control when the regeneration coordination switch is performed, as compared to frequency of execution of the vibration suppression control when the regeneration coordination switch is not being performed.

According to the foregoing electric vehicle, when the regeneration coordination switch is being performed, the vibration suppression control of restraining vibration of the vehicle is more frequently executed than when the regeneration coordination switch is not being performed. As a result, the vibration of the vehicle during the regeneration coordination switch can be restrained. Furthermore, because the vibration suppression control is more frequently executed during the regeneration coordination switch, the electric vehicle is able to restrain increasing of the energy consumption more than an electric vehicle in which the vibration suppression control is always performed regardless of whether the regeneration coordination switch is being performed.

In the foregoing electric vehicle, the electronic control unit may be configured to execute the vibration suppression control when the regeneration coordination switch is being performed.

According to this construction, vibration of the vehicle can be more effectively restrained at the time of the regeneration coordination switch, even if the switching between equal amounts cannot be performed due to the difference in response speed between the electric motor and the hydraulic brake, a communication lag and the like.

In the electric vehicle, the electronic control unit may be configured to execute the vibration suppression control when fluctuation of the regenerative torque or drive torque that acts on the drive shaft is greater than or equal to a predetermined value.

According to this construction, when the regeneration coordination switch is not being performed, the vibration suppression control is executed if the fluctuation of the regenerative torque or the drive torque that acts on the drive shaft is greater than or equal to the predetermined value. On the other hand, during the regeneration coordination switch, the vibration suppression control is executed not only when the fluctuation of the regenerative torque or the drive torque that acts on the drive shaft is greater than or equal to the predetermined value but also when the fluctuation is less than the predetermined value.

In the foregoing electric vehicle, the electronic control unit may be configured to execute the vibration suppression control regardless of fluctuation of the regenerative torque or the drive torque that acts on the drive shaft, when the regeneration coordination switch is being performed. Alternatively, the vibration suppression control may be executed when the fluctuation of the regenerative torque or the drive torque that acts on the drive shaft is greater than or equal to a second predetermined value that is smaller than the aforementioned predetermined value.

A second aspect of the invention is a control method for an electric vehicle which includes: outputting regenerative torque to a drive shaft connected to an axle shaft; providing braking force for the vehicle; and increasing frequency of restraining vibration of the vehicle when switching at least part of the regenerative torque from the electric motor to the braking force from a hydraulic brake, as compared to frequency of restraining vibration of the vehicle when not switching the regenerative torque to the braking force.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described.

Figure 1:
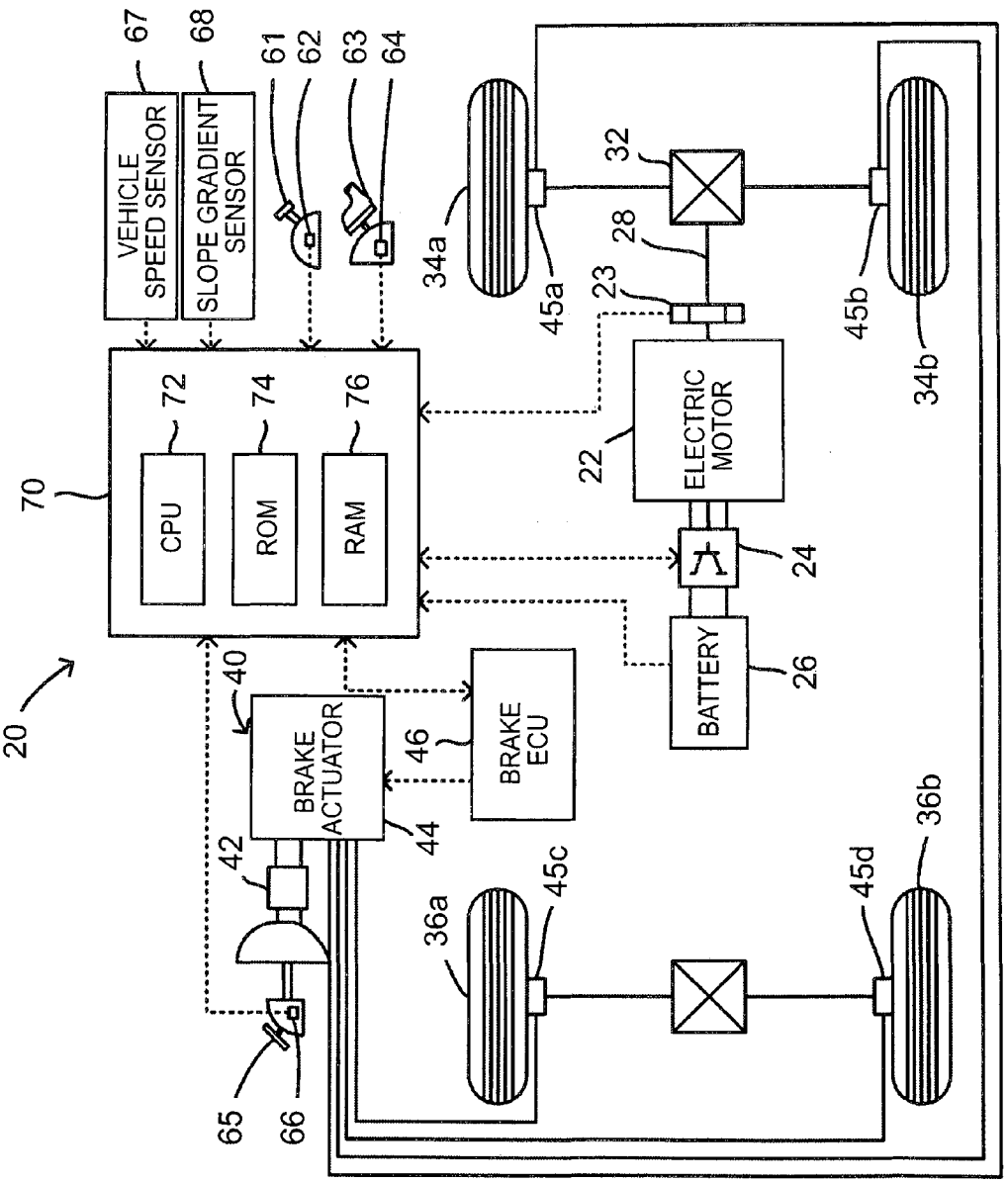
FIG. 1 is a construction diagram showing a general construction of an electric motor vehicle 20 as an embodiment of the invention.

FIG. 1 is a construction diagram showing a general construction of an electric motor vehicle 20 as an embodiment of the invention. The electric motor vehicle 20 of this embodiment, as shown in FIG. 1, is equipped with an electric motor 22, an inverter 24, a battery 26, a brake system 40 and a main electronic control unit 70. The electric motor 22 outputs motive power to and receives input of motive power from a drive shaft 28 that is connected to driving wheels 34a and 34b via a differential gear 32. The inverter 24 drives the electric motor 22. The battery 26 sends electric power to and receives electric power from the electric motor 22 via the inverter 24. The brake system 40 (corresponding to a "hydraulic brake" in the invention) applies mechanical braking force to the driving wheels 34a and 34b and driven wheels 36a and 36b. The main electronic control unit 70 controls the entire vehicle.

The electric motor 22 is constructed as a synchronous generator-motor that includes a rotor that is connected to the drive shaft 28 and that carries permanent magnets buried therein, and a stator on which three-phase coils are wound. The inverter 24 is constructed of six switching elements (not shown), and converts direct-current electric power supplied from the battery 26 into pseudo three-phase alternating-current electric power, and supplies the converted electric power to the electric motor 22.

The brake system 40 includes a master cylinder 42, a brake actuator 44, a brake electronic control unit (hereinafter, referred to as "brake ECU") 46. The master cylinder 42 is pressurized as the brake pedal 65 is depressed. The brake actuator 44 adjusts the hydraulic pressure on the wheel cylinders 45a, 45b, 45c and 45d of the driving wheels 34a and 34b and the driven wheels 36a and 36b. The brake ECU 46 controls the brake actuator 44. The brake ECU 46 accepts input of master cylinder pressure (brake depression force Fb) detected by a pressure sensor (not shown) that is attached to the master cylinder 42, and the like. The brake ECU 46 outputs a drive signal to the brake actuator 44. The brake ECU 46 accepts input, via signal lines (not shown), of various signals that represent wheel speeds detected by wheel speed sensors (not shown) attached to the driving wheels 34a and 34b and the driven wheels 36a and 36b, the steering angle detected by a steering angle sensor (not shown), etc. On the basis of these signals, the brake ECU 46 performs an antilock brake system function (ABS) of preventing any one of the driving wheels 34a and 34b and the driven wheels 36a and 36b from locking and slipping when a driver depresses a brake pedal 65. Furthermore, the brake ECU 46 also performs a traction control (TRC) of preventing either one of the driving wheels 34a and 34b from undergoing wheel spin and therefore slipping when a driver depresses an accelerator pedal 63. Furthermore, the brake ECU also performs a vehicle stability control (VSC) of maintaining the posture of the vehicle when the vehicle is turning or cornering. In conjunction with this embodiment, the brake system 40 is sometimes referred to as "hydraulic brake" as well.

The main electronic control unit 70 is constructed as a microprocessor whose main component is a CPU 72. Besides the CPU 72, the main electronic control unit 70 also includes a ROM 74 in which processing programs are pre-stored, a RAM 76 for temporarily storing data, input/output ports and a communication port (none of the ports is shown in the drawings). The main electronic control unit 70 accepts input of rotational position, phase current, inter-terminal voltage, charge/discharge current, battery temperature, shift position SP, accelerator operation amount Acc, brake pedal position BP, vehicle speed V, slope gradient θ, etc. via the input port, in the following manners. The rotational position is input from rotational position detection sensor 23 that detects the rotational position of the rotor of the electric motor 22. The phase current is input from an electric current sensor (not shown) that is attached to a connection line (electric power line) between the electric motor 22 and the inverter 24. The inter-terminal voltage is input from a voltage sensor (not shown) that is disposed between the terminals of the battery 26. The charge/discharge current is input from an electric current sensor (not shown) that is attached to an electric power line that is connected to an output terminal of the battery 26. The battery temperature is input from a temperature sensor (not shown) that is attached to the battery 26. The shift position SP is input from a shift position sensor 62 that detects the operating position of a shift lever 61. The accelerator operation amount Acc is input from an accelerator pedal position sensor 64 that detects the amount of depression of the accelerator pedal 63. The brake pedal position BP is input from a brake pedal position sensor 66 that detects the amount of depression of the brake pedal 65. The vehicle speed V is input from a vehicle speed sensor 67. The slope gradient θ is input from a slope gradient sensor 68 that detects the slope gradient of the road surface, the slope gradient θ being positive for uphill and negative for downhill. Furthermore, the main electronic control unit 70 outputs via the output port a switching control signal to the inverter 24 that drive the electric motor 22, among other signals and the like. The main electronic control unit 70 computes the rotation speed Nm of the electric motor 22 on the basis of the rotational position of the rotor of the electric motor 22 detected by a rotational position detection sensor 23. The main electronic control unit 70 computes the state of charge (SOC) of the battery 26 that is a proportion of the amount of charge dischargeable from the battery 26 to the total capacity (storage capacity) on the basis of the integrated value of the charge/discharge current of the battery 26 detected by the current sensor. The main electronic control unit 70 computes an input restriction Win and an output restriction Wout that are a maximum permissible electric power that is allowed to be charged into or discharged from the battery 26, on the basis of the battery temperature of the battery 26 detected by the temperature sensor and the computed SOC of the battery 26. The input restriction Win is computed so that the restriction is severer as the SOC is higher. Furthermore, the main electronic control unit 70 is connected to the brake ECU 46 via the communication port (not shown) and exchanges various control signals and data with the brake ECU 46.

The electric motor vehicle 20 of the embodiment has the following positions of the shift lever 61 that are detected by the shift position sensor 62. That is, those shift positions are the parking position (P position), the neutral position (N position), the drive position (D position), the brake position (B position), the reverse position (R position), etc. The drive position (D position) is a position for forward travel of the vehicle. When the brake position (B position) is selected, the vehicle travels forward but the braking force at the time of undepression of the accelerator pedal 63 is greater than when the drive position is selected. The reverse position (R position) is a position for reverse travel of the vehicle.

In the electric motor vehicle 20 of the embodiment constructed as described above, a demanded torque Td* that needs to be output to the drive shaft 28 is calculated on the basis of the vehicle speed V and the accelerator operation amount Acc that corresponds to the amount of depression of the accelerator pedal 63 accomplished by the driver. The demanded torque Td* is then subjected to restriction by the input restriction Win and the output restriction Wout of the battery 26, whereby a torque command Tm* is set as a torque that needs to be output from the electric motor 22. Then, on the basis of the torque command Tm*, the electric motor 22 is driven and controlled.

When the electric motor vehicle 20 of the embodiment decelerates upon the turning-off of the accelerator during travel of the vehicle, the brake is controlled with the braking force commensurate with the shift position SP and the brake depression force Fb that is provided by the regenerative control through the use of the electric motor 22. The control of the brake includes the regenerative control that is performed within the range of the input restriction Win of the battery 26 and within the range of rated values of the electric motor 22. Simultaneously, the control of the brake includes a control of the brake actuator 44 of the brake system 40 (hydraulic brake) so as to output the amount of braking force by which the braking force provided by the regenerative control of the electric motor 22 (regenerative torque) is short from the braking force needed (if any such shortfall amount exists). Then, when the vehicle speed V becomes small, a regeneration coordination switching control is performed in order to smoothly stop the vehicle without allowing occurrence of a shock to the vehicle or the like. That is, the braking force (regenerative torque) provided by the electric motor 22 is gradually switched to the braking force provided by the brake system 40. The control of action of the braking force and the regeneration coordination switching control through the use of the electric motor 22 and the brake system 40 are collectively termed the brake coordination control. By performing the brake coordination control, large amounts of kinetic energy can be regenerated or recovered as electric power by the electric motor 22 and thus can be stored in the battery 26. Furthermore, due to this control, it is possible to stop the vehicle while restraining occurrence of a shock to the vehicle. An example of the brake coordination control will be shown below. For example, the main electronic control unit 70 calculates the torque command Tm* as a regenerative torque that is to be output from the electric motor 22 and a target braking force B* as a braking force that is provided by the brake system 40, and sends the target braking force B* to the brake ECU 46. The main electronic control unit 70 drives and controls the electric motor 22 on the basis of the torque command Tm*. At the same time, the brake ECU 46 drives and controls the brake actuator 44 on the basis of the target braking force B*. In this manner of control, the brake coordination control can be executed.

Next, operations of the electric motor vehicle 20 of the embodiment constructed as described above and, in particular, operations performed in the process of determining whether there is a request for execution of a vibration suppression control of reducing or suppressing vibration of the vehicle will be described. The vibration suppression control can be performed by setting a torque command Tm* and controlling the driving of the electric motor 22 on the basis of the torque command Tm*. The torque command Tm* is set by adding to the demanded torque Td* to a vibration suppression correction torque that is in such a direction as to cancel out the torque fluctuation of the drive shaft 28. In this case, the torque fluctuation of the drive shaft 28 appears as an amount of change in the rotation speed (rotation speed fluctuation) of the drive shaft 28. Therefore, the torque fluctuation of the drive shaft 28 can be substituted by rotation speed fluctuation $\Delta Nm$ as per-unit-time amount of change in the rotation speed Nm of the electric motor 22 equal to the rotation speed Nd of the drive shaft 28. Therefore, it suffices that the vibration suppression correction torque is determined so as to cancel out the cyclic change of the rotation speed fluctuation $\Delta Nm$. This vibration suppression control can be executed, for example, by the main electronic control unit 70. As for the content of the vibration suppression control, any control (well-known control) may be employed as long as the control is able to restrain vibration of the vehicle.

Figure 2:
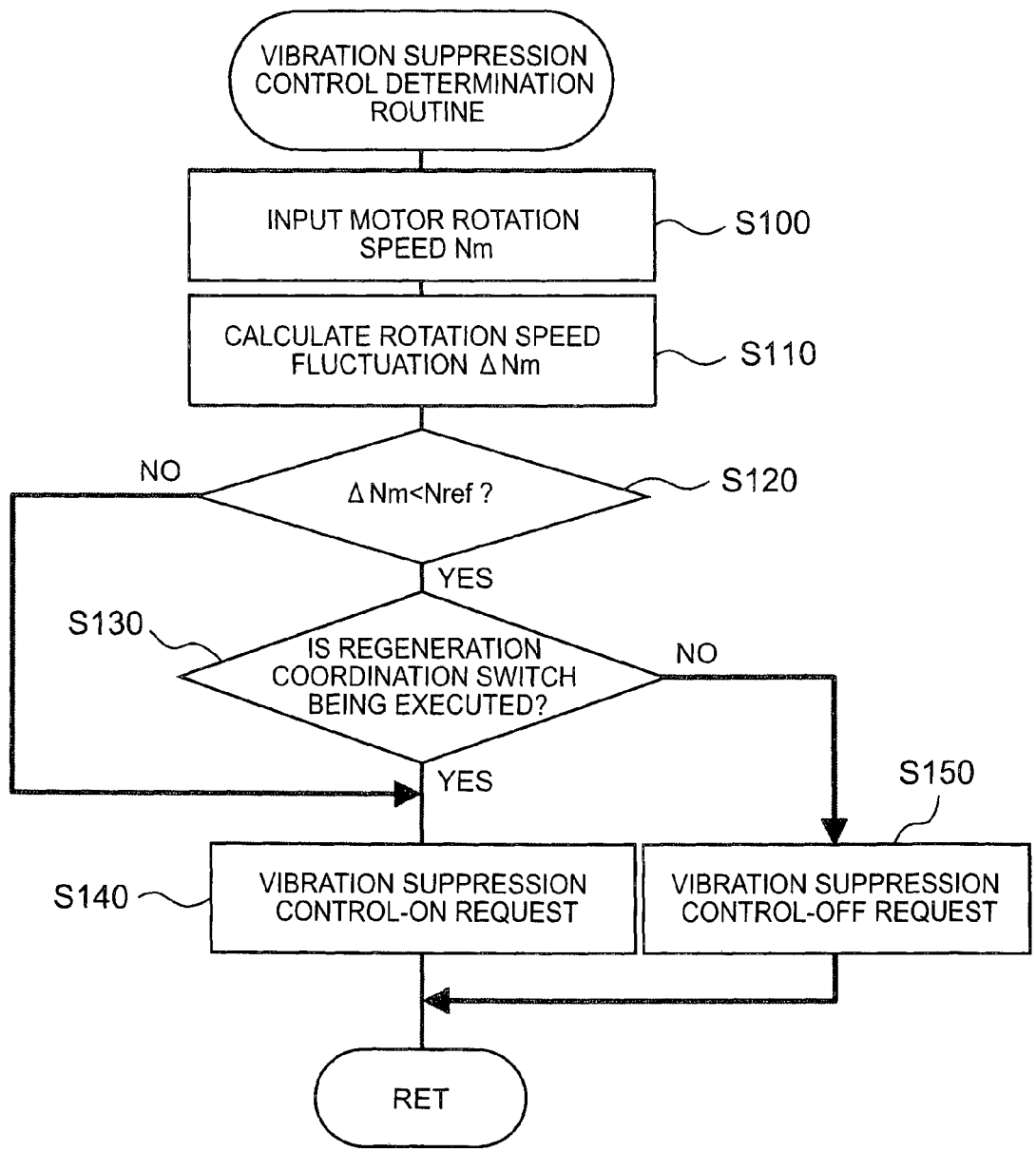
FIG. 2 is a flowchart showing an example of a routine determining whether to execute a vibration suppression control that is executed by a main electronic control unit 70 in accordance with the embodiment.

FIG. 2 is a flowchart showing an example of a routine determining whether to execute a vibration suppression control that is executed by the main electronic control unit 70 at the time of determining the presence or absence of a request for execution of the vibration suppression control. This routine is repeatedly executed at every predetermined time (e.g., every several ten milliseconds). When the vibration suppression control execution determination routine is executed, the CPU 72 of the main electronic control unit 70 firstly takes in the rotation speed Nm of the electric motor 22 in step S100. Next, in step S110, the CPU 72 calculates rotation speed fluctuation $\Delta Nm$ by subtracting the rotation speed Nm input a certain time earlier (e.g., 4 milliseconds before or 8 milliseconds before) of the rotation speeds Nm input before the newly input rotation speed Nm. The rotation speed fluctuation $\Delta Nm$ substitutes the torque fluctuation of the drive shaft 28 as described above. Therefore, the processes of steps S100 and S110 have substantially the same meaning as a process of calculating the torque fluctuation of the drive shaft 28.

Subsequently, in step S120, the rotation speed fluctuation ΔNm calculated in step S110 is compared with a threshold value Nref. When the rotation speed fluctuation ΔNm is greater than or equal to the threshold value Nref, the process proceeds to step S140. In step S140, if the vibration suppression control is not being executed, a vibration suppression control-on request is output and the vibration suppression control will be executed, or if the vibration suppression control is being executed, the execution of the vibration suppression control will be continued. Then, the routine ends. The threshold value Nref is determined beforehand through experiments or the like as a value of the rotation speed fluctuation ΔNm that is so large as to be determined to cause on the vehicle a degree of vibration that requires the vibration suppression control. The process of steps S120 and S240 has substantially the same meaning as a process of making a request for execution of the vibration suppression control when the torque fluctuation of the drive shaft 28 is greater than or equal to the threshold value.

On the other hand, if in step S120 it is determined that the rotation speed fluctuation ΔNm is less than the threshold value Nref, the process proceeds to step S130. In step S130, it is determined whether the regeneration coordination switching control is being executed. If the regeneration coordination switching control is being executed, that is, if the regenerative torque of the electric motor 22 is being switched to the braking force provided by the brake system 40, the process proceeds to step S140, in which the vibration suppression control-on request is output. After that, this routine ends. On the other hand, if the regeneration coordination switching control is not being executed, that is, the regenerative torque of the electric motor 22 is not being switched to the braking force provided by the brake system 40, the process proceeds to step S150. In step S150, if the vibration suppression control is being executed, a vibration suppression control-off request is output and the execution of the vibration suppression control will be stopped, or if the vibration suppression control is not being executed, the state in which the vibration suppression control is not being executed will be continued. The process of steps S130 to S150 can be said to be a process of causing the vibration suppression control to be executed more frequently when the regeneration coordination switching control is being executed than when the regeneration coordination switching control is not being executed. In this embodiment, when the regeneration coordination switching control is being executed, the request for execution of the vibration suppression control is output even if the rotation speed fluctuation ΔNm is less than the threshold value Nref. When the regenerative torque of the electric motor 22 is being switched to the braking force provided by the brake system 40, the drive shaft 28 is more likely to have torque fluctuation due to low response speed of the brake system 40 as compared with the response speed of the electric motor 22 and also due to a delay in the communication between the main electronic control unit 70 and the brake ECU 46 (a communication lag therebetween). According to this embodiment, execution of the vibration suppression control can be started before vibration occurs on the vehicle due to torque fluctuation of the drive shaft 28. Therefore, it is possible to restrain the occurrence of vibration of the vehicle due to torque fluctuation of the drive shaft 28 and, if any such vibration occurs on the vehicle, quickly lessen the vibration.

According to the electric motor vehicle 20 of the embodiment described above, even when the rotation speed fluctuation ΔNm of the electric motor 22 is less than the threshold value Nref, that is, even when the torque fluctuation of the drive shaft 28 is less than the threshold value and therefore execution of the vibration suppression control is usually not requested, the request for execution of the vibration suppression control is made provided that the regeneration coordination switching control is being executed. As a result, it becomes possible to restrain the occurrence of vibration of the vehicle due to torque fluctuation of the drive shaft 28 that is likely to occur when the regenerative torque of the electric motor 22 is being switched to the braking force provided by the brake system 40. Furthermore, if vibration occurs on the vehicle due to torque fluctuation of the drive shaft 28 when the regeneration coordination switching control is being executed, the vibration of the vehicle can be quickly lessened. Furthermore, according to the embodiment, while the regeneration coordination switching control is not executed, execution of the vibration suppression control is requested when the rotation speed fluctuation ΔNm of the electric motor 22 is greater than or equal to the threshold value, and non-execution of the vibration suppression control is requested when the rotation speed fluctuation ΔNm of the electric motor 22 is less than the threshold value. Hence, deterioration in energy efficiency can be restrained in comparison with a vehicle in which the vibration suppression control is always executed.

In the electric motor vehicle 20 of the embodiment described above, when the regeneration coordination switching control is being executed, execution of the vibration suppression control is requested regardless of whether the rotation speed fluctuation ΔNm of the electric motor 22 is greater than or equal to the threshold value Nref. However, this does not restrict the invention, that is, it suffices in the invention that the vibration suppression control is caused to be executed more frequently when the regeneration coordination switching control is being executed than when the regeneration coordination switching control is not being executed. For example, it is permissible to adopt a construction in which when the regeneration coordination switching control is being executed, execution of the vibration suppression control is requested if the rotation speed fluctuation ΔNm of the electric motor 22 is greater than or equal to a threshold value Nref2 that is smaller than the threshold value Nref, and non-execution of the vibration suppression control is requested if the rotation speed fluctuation ΔNm of the electric motor 22 is less than the threshold value Nref2.

In the electric motor vehicle 20 of the foregoing embodiment, the request for execution of the vibration suppression control (vibration suppression control-on request) and the request for non-execution of the vibration suppression control (vibration suppression control-off request) are selectively output in accordance with the determination as to whether the rotation speed fluctuation ΔNm of the electric motor 22 is greater than or equal to the threshold value Nref and the determination as to whether the regeneration coordination switching control is being executed. However, this does not restrict the invention. For example, it is also permissible to adopt a construction in which the request for execution of the vibration suppression control (vibration suppression control-on request) and the request for non-execution of the vibration suppression control (vibration suppression control-off request) are selectively output in accordance with the determination as to whether the torque fluctuation of the drive shaft 28 is greater than or equal to a threshold value and the determination as to whether the regeneration coordination switching control is being executed.

Figure 3:
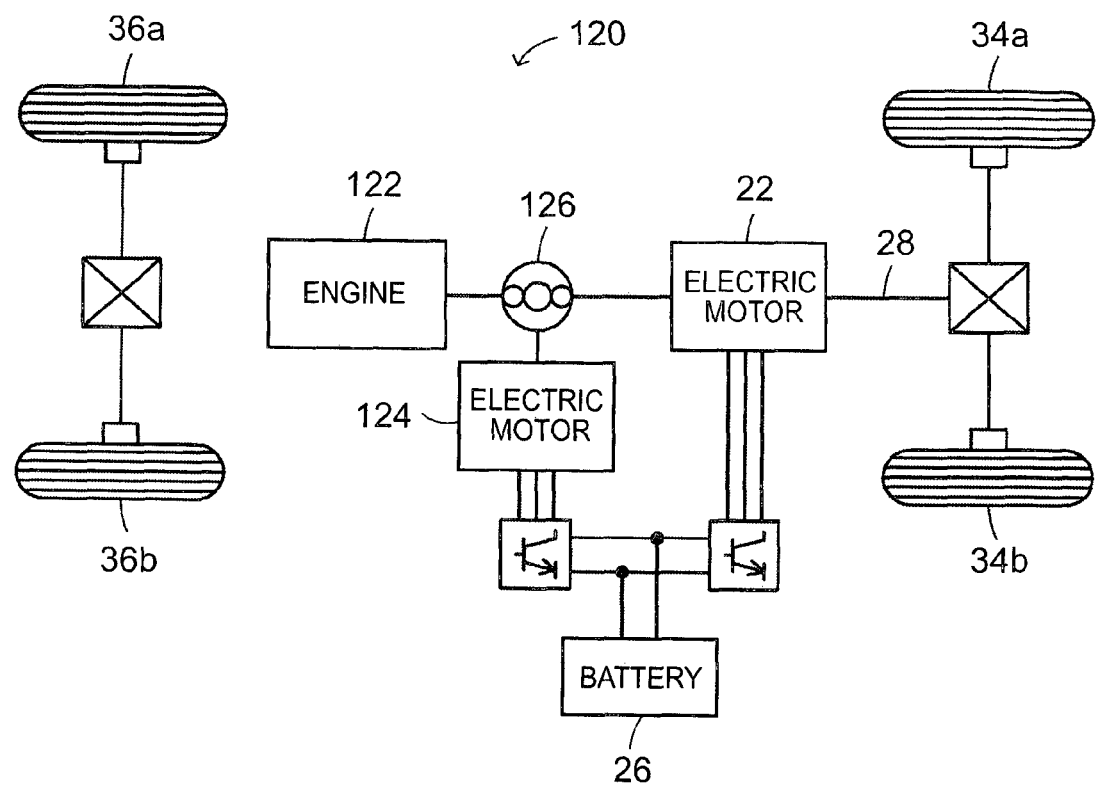
FIG. 3 is a construction diagram showing a general construction of a hybrid motor vehicle 120 in accordance with a modification of the embodiment.
Figure 4:
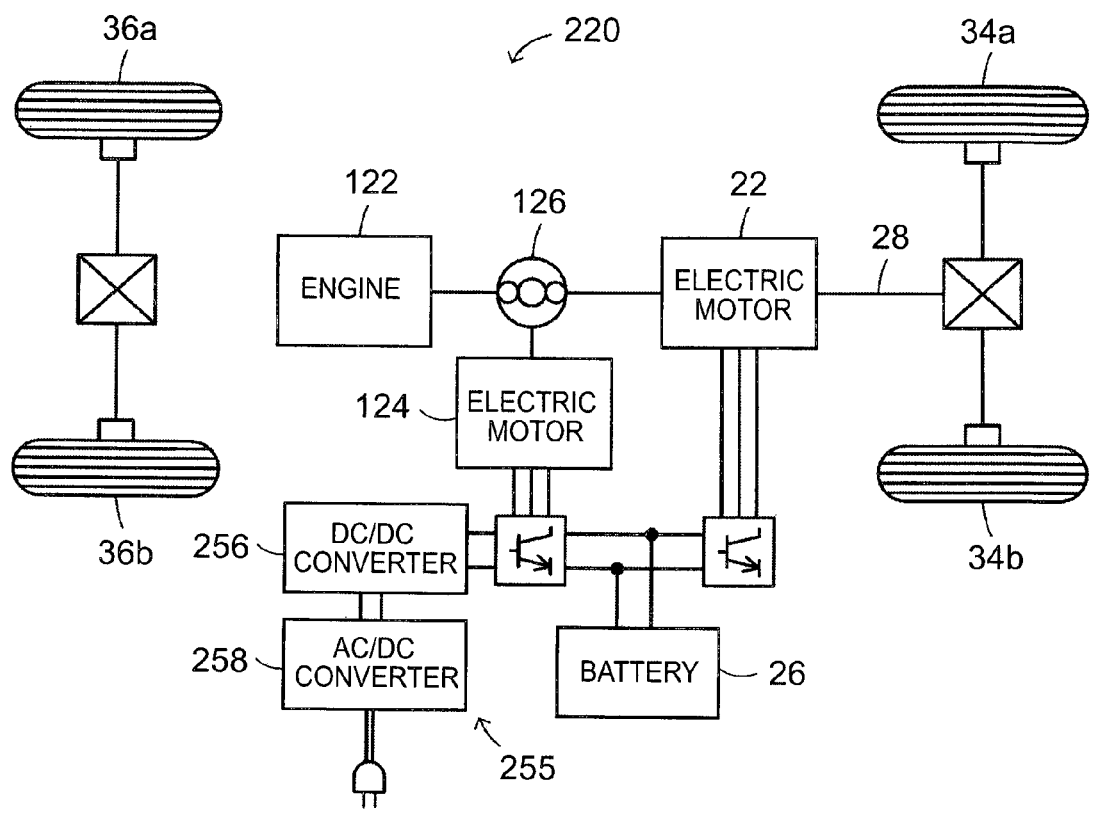
FIG. 4 is a construction diagram showing a general construction of a hybrid motor vehicle 220 in accordance with another modification.

The foregoing embodiment is applied to the electric motor vehicle 20 equipped with the electric motor 22 capable of output of motive power to and input of motive power from the drive shaft 28. However, the invention is not limited to this application, but is applicable to any type of vehicle as long as the vehicle is capable of outputting braking force in response to the turning-on of the brake through coordination between an electric motor and the brake apparatus and also capable of outputting braking force in response to the turning-off of the accelerator from the electric motor. For example, the invention may be applied to an electric motor vehicle equipped with two or more electric motors, a series-type hybrid motor vehicle, a parallel-type hybrid motor vehicle, etc. As an example, a hybrid motor vehicle 120 in accordance with a modification of the embodiment is illustrated in FIG. 3. In the modification shown in FIG. 3, the invention is applied to the hybrid motor vehicle 120 equipped with an engine 122 and an electric motor 124 that are connected to a drive shaft 28 via a planetary gear mechanism 126 and also with an electric motor 22 capable of input and output of motive power from and to the drive shaft 28. Alternatively, a hybrid motor vehicle 220 in accordance with another modification shown in FIG. 4 is also permissible. That is, the invention may also be applied to a so-called plug-in hybrid motor vehicle obtained by providing the hybrid motor vehicle 120 shown in FIG. 3 with a battery charger 255 that has an AC/DC converter 258 and a DC/DC converter 256 that are for use for converting the alternating-current electric power from a commercial power supply into direct-current electric power and storing the direct-current electric power into the battery.

Incidentally, in the foregoing embodiment, the process performed by the main electronic control unit 70 in which the vibration suppression control execution determination routine shown in FIG. 2 is executed corresponds to a process in which when a regeneration coordination switch in which at least part of the regenerative torque from the electric motor is gradually switched to the braking force from the hydraulic brake is being performed, frequency of execution of a vibration suppression control of restraining vibration of the vehicle is made greater than when the regeneration coordination switch is not being performed.

The correspondence between major elements of the embodiment and major elements of the invention described above in SUMMARY OF THE INVENTION does not restrict the elements of invention described above in SUMMARY OF THE INVENTION, since the embodiment is merely an example for concretely describing forms or modes of carrying out the invention described above in SUMMARY OF THE INVENTION. That is, the interpretation of the invention described above in SUMMARY OF THE INVENTION should be based on what is written in SUMMARY OF THE INVENTION, and the embodiment is merely a concrete example of the invention described above in SUMMARY OF THE INVENTION.

While forms for carrying out the invention have been described with reference to the embodiment and the like, it should be apparent that the invention is not limited by the foregoing embodiment or the like in any manner and can be carried out in various forms without departing from the gist of the invention.

The invention is applicable to manufacture industries for electric vehicles.

The invention claimed is:

1. An electric vehicle comprising:
    an electric motor configured to output regenerative torque to a drive shaft connected to driving wheels;
    a hydraulic brake configured to provide braking force for the electric vehicle; and
    an electronic control unit configured to execute a regeneration coordination switch in which at least part of the regenerative torque from the electric motor is gradually switched to the braking force from the hydraulic brake,
    the electronic control unit being configured to execute a vibration suppression control that restrains vibration of the vehicle, and
    the electronic control unit being configured to increase frequency of execution of the vibration suppression control when the regeneration coordination switch is performed, as compared to frequency of execution of the vibration suppression control when the regeneration coordination switch is not being performed.

2. The electric vehicle according to claim 1, wherein the electronic control unit is configured to execute the vibration suppression control when the regeneration coordination switch is being performed.

3. The electric vehicle according to claim 1, wherein the electronic control unit is configured to execute the vibration suppression control when fluctuation of the regenerative torque or fluctuation of a drive torque that acts on the drive shaft is greater than or equal to a predetermined value.

4. The electric vehicle according to claim 1, wherein the electronic control unit is configured to execute the vibration suppression control regardless of fluctuation of the regenerative torque or fluctuation of a drive torque that acts on the drive shaft, when the regeneration coordination switch is being performed.

5. A control method for an electric vehicle, the electric vehicle including an electric motor, a hydraulic brake, and an electric control unit, the control method comprising:
    outputting regenerative torque from the electric motor to a drive shaft connected to driving wheels;
    providing braking force for the vehicle by the hydraulic brake; and
    increasing frequency of restraining vibration of the vehicle, by the electric control unit, when switching at least part of the regenerative torque from the electric motor to the braking force from a hydraulic brake, as compared to frequency of restraining vibration of the vehicle when not switching the regenerative torque to the braking force.

* * * * *